United States Patent [19]
Pohlenz et al.

[11] Patent Number: 4,961,482
[45] Date of Patent: Oct. 9, 1990

[54] OSCILLATION DAMPER

[75] Inventors: Hans Pohlenz, Boppard; Günter Wagner, Nörtershausen, both of Fed. Rep. of Germany

[73] Assignee: Stabilus GmbH, Koblenz-Neuendorf, Fed. Rep. of Germany

[21] Appl. No.: 339,141

[22] Filed: Apr. 17, 1989

[30] Foreign Application Priority Data

Apr. 21, 1988 [DE] Fed. Rep. of Germany ....... 3813402

[51] Int. Cl.⁵ ............................................. F16F 9/348
[52] U.S. Cl. ................................. 188/280; 137/517; 137/854; 188/282; 188/317; 188/322.15
[58] Field of Search ........... 188/280, 282, 317, 322.15, 188/322.22; 137/854, 517, 521

[56] References Cited

U.S. PATENT DOCUMENTS

| | | | |
|---|---|---|---|
| 1,748,531 | 2/1930 | Troup | 137/854 X |
| 2,310,570 | 2/1943 | Briggs | 188/282 X |
| 2,622,792 | 12/1952 | Ramelow | 137/854 X |
| 3,074,515 | 1/1963 | MacLellan | 188/280 |

FOREIGN PATENT DOCUMENTS

| | | | |
|---|---|---|---|
| 2109398 | 3/1979 | Fed. Rep. of Germany | 188/282 |
| 2721933 | 6/1981 | Fed. Rep. of Germany | . |

*Primary Examiner*—George E. A. Halvosa
*Attorney, Agent, or Firm*—Brumbaugh, Graves, Donohue & Raymond

[57] ABSTRACT

In an illustrative example, an oscillation damper for damping the steering movement of the handle bar of a motorcycle comprises a cylinder and a piston rod axially movable with respect to the cylinder. A damping piston is provided at the inner end of the piston rod and divides the cavity within the cylinder into two working chambers. These working chambers are interconnected by at least one axial bore through the piston. Valve discs are provided on both axial end faces of the piston. These valve discs are fixed to the piston in their respective central areas. Circumferential areas of the valve discs define circumferential gaps with the respective end faces. In response to the velocity of axial relative movement of the piston rod with respect to the cylinder the circumferential areas of respective valve discs are approached to the respective end faces. So the damping resistance is increased.

11 Claims, 4 Drawing Sheets

OSCILLATION DAMPER

BACKGROUND OF THE INVENTION

This invention relates to an oscillation damper which provides a progressive damping force in response to the velocity of relative movement of the cylinder member and the piston rod member.

The oscillation damper of the present invention is particularly useful for damping the steering movement of handle bars of motorcycles.

STATEMENT OF THE PRIOR ART

From German Patent No. 2,721,933 an oscillation damper has been known which comprises a cylinder member and a piston rod member movable inwards and outwards of the cylinder member in the axial direction thereof. A piston unit is provided on the piston rod member within the cavity defined within the cylinder member. The piston unit divides the cavity into two working chambers. Within the piston unit there is provided a closed annular space. This annular space is limited by an intermediate disc and a support disc. Between this intermediate disc and this support disc there is provided a resilient disc. At zero velocity of the relative movement of the cylinder member and the piston rod member, the valve disc covers the valve bores of the intermediate disc. Starting from a predetermined velocity of the piston unit, the resilient valve disc is applied against the support disc and covers the valve bores in the support disc such that the outflow of the working chamber surrounding the piston rod member is interrupted and a strong damping action is achieved. It is regarded as a disadvantage of this known device that it consists of a plurality of high precision components which involve expensive manufacturing and assembling.

A further disadvantage is seen in the fact that the damping arrangement of the known device is only effective for one direction of relative movement.

OBJECT OF THE INVENTION

It is a primary object of the present invention to provide an oscillation damper which comprises a reduced number of components and which can be easily assembled.

SUMMARY OF THE INVENTION

In view of the above object, the oscillation damper comprises a cylinder member having an axis and defining a cavity therein. Further, the oscillation damper comprises a piston rod member axially movable with respect to said cylinder member inwards and outwards of said cavity. At least two compartments are provided within said cavity. Said compartments contain a damping liquid and are interconnected by a damping valve unit. A throttled flow of liquid occurs through said damping valve unit as a response to axial movement of said piston rod member with respect to said cylinder member. The throttling effect of said damping valve is increased in response to increasing movement velocity of the axial movement such as to provide an increased damping resistance to said axial movement in response to said increasing movement velocity. The damping valve unit comprises a carrier member and at least one resilient valve disc overlying at least one face of said carrier member. The valve disc has a central portion attached to said face of said carrier member and a circumferential portion spaced from said face at zero movement velocity. At least one valve bore extends through said carrier member between said compartments and has an opening towards one of said compartments within said face and below said circumferential portion of said resilient valve disc. A wedge-shaped circumferential gap is defined at zero velocity between said face and said circumferential portion of said resilient valve disc. Said wedge-shaped circumferential gap is in communication with the other of said compartments through said opening and said valve bore at zero movement velocity. Said communication is at least partially closed at increasing movement velocity by said circumferential portion approaching said face in response to increased liquid flow velocity from said one to said other compartment. Said wedge-shaped circumferential gap is open to said one compartment at zero movement velocity.

By this invention the damping valve unit has a very simple design. The components of the damping unit can be easily manufactured and assembled. This is due to the fact that the wedge-shaped circumferential gap is open to said one compartment at zero movement velocity. A highly desirable characteristic of the damping force is achieved, namely a characteristic having a slow increase of the movement resisting force up to a predetermined relative movement velocity and a strongly increased movement resisting force after exceeding said predetermined relative movement velocity. The transition from the slow increase to the stronger increase occurs suddenly when the circumferential portion of the resilient valve disc approaches the respective face of the carrier member. This approach occurs instantaneously in response to a predetermined value of the flow velocity through the gap. The oscillation damper of this invention has a well defined damping resistance which varies only to a small extent from product to product.

In order to prevent an instantaneous blocking of the oscillation damper, a minimum cross-section flow passage may exist between said compartment even if said circumferential gap is fully closed. This minimum cross-section flow passage can be established in that at least one valve bore is in communication with at least one groove provided in said face, said groove extending beyond said circumferential portion of said resilient valve disc.

While the prior art oscillation damper as discussed above provides only a desired damping effect for one direction of relative movement, the present invention allows to obtain a desired damping resistance behaviour for both directions of axial movement in that said carrier member is provided with oppositely directed faces, respective resilient valve discs being allocated to each of said faces. At least one valve bore is allocated to each of said faces such as to provide a respective opening therein below the circumferential portion of the respective resilient valve disc. Such identical or similar damping force/velocity characteristic may be obtained for both directions of axial relative movement of the piston rod member and the cylinder member.

While the resiliency of the resilient valve disc may be obtained by the respective shape of the resilient valve discs, further advantages may be obtained in that said circumferential portion of said at least one resilient valve disc is elastically biased towards its zero movement velocity position by support means at least partially accommodated within said carrier member. By this further development of the present invention the variation in characteristic from product to product may be reduced because the support means can be easily manufactured with an identical characteristic.

The support means may comprise helical compression springs accommodated within respective pockets of said carrier member.

In case of an embodiment having two axially opposite faces and two respective resilient valve discs, circumferential portions of both said resilient valve discs may be supported in their respective zero movement velocity position by support pins movably accommodated by respective guide bores through said carrier member, said support pins being longer than the distance between said faces and engaging both valve discs. In such an embodiment, both valve discs are held in an open position with respect to the respective opening as long as no substantial axial relative movement of the piston rod member and the cylinder member occurs. If, however, a predetermined axial movement velocity occurs in one predetermined direction, both valve discs cooperate through the support pin to control the closing movement of one respective valve disc. A very strongly progressive increase of the damping resistance is achieved by this movement. A plurality of valve bores may be provided in parallel within said carrier member to be closed by one respective valve disc.

The circumferential gap can be obtained in that said at least one face is substantially plane and said at least one resilient valve disc is convex towards said at least one face at zero movement velocity. This embodiment is particularly useful in connection with support means supporting the respective circumferential portion of the valve disc, and in connection with the above discussed embodiment comprising support pins.

According to a further embodiment said at least one face is convex towards the overlying resilient valve disc, and the valve disc is substantially plane at zero movement velocity. This embodiment is particularly useful in cases in which no additional support means or pin means are provided for resiliently supporting the resilient valve disc.

In the embodiment comprising resilient valve discs on two opposite faces of the carrier member, a most simple design is obtained in that each one of a plurality of bores has openings in both faces below the circumferential portion of the respective valve discs.

In a conventional way, the carrier member may be at least part of a piston unit connected to the piston rod member and dividing said cavity into two working chambers.

This invention further relates to a damping valve unit particularly for use in an oscillation damper. The damping valve comprises a carrier member and two resilient valve discs overlying two oppositely directed faces of said carrier member. Said valve discs have a central portion attached to respective faces of said carrier member and respective circumferential portions spaced from said respective faces. At least one valve bore is allocated to each of said faces and said valve discs and extends between said faces. Said at least one valve bore has an opening within at least one respective face and below the circumferential portion of the respective disc. Wedge-shaped circumferential gaps are defined between the respective face and the circumferential portion of the respective valve disc.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to the embodiments shown in the accompanying drawings, in which.

DESCRIPTION OF THE PREFERRED EMBODIMENTS

Figure 1:
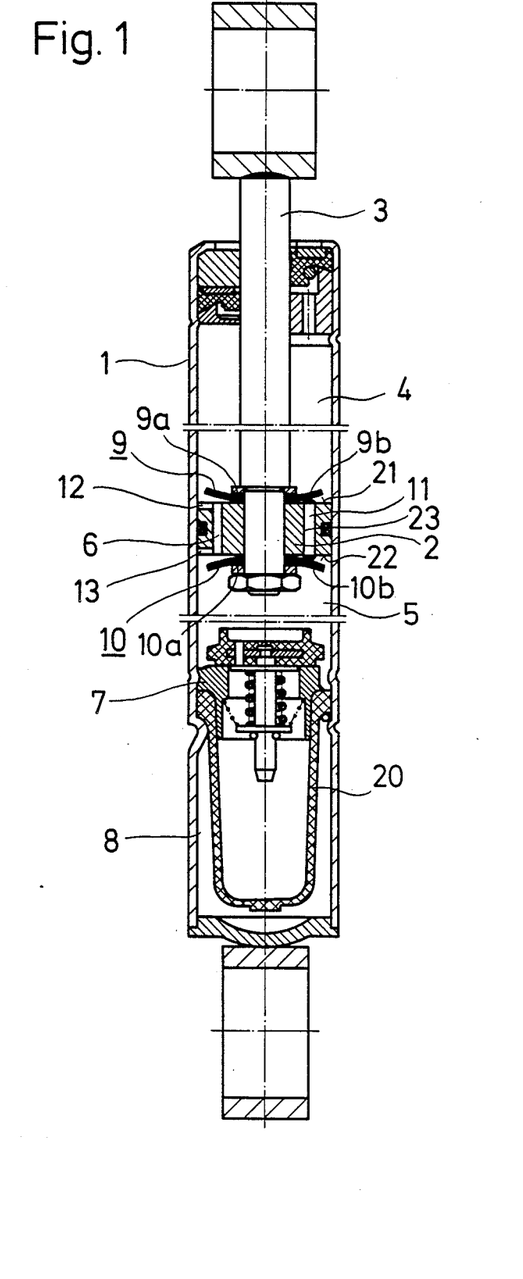
FIG. 1 shows a longitudinal section of an oscillation damper.
Figure 2:
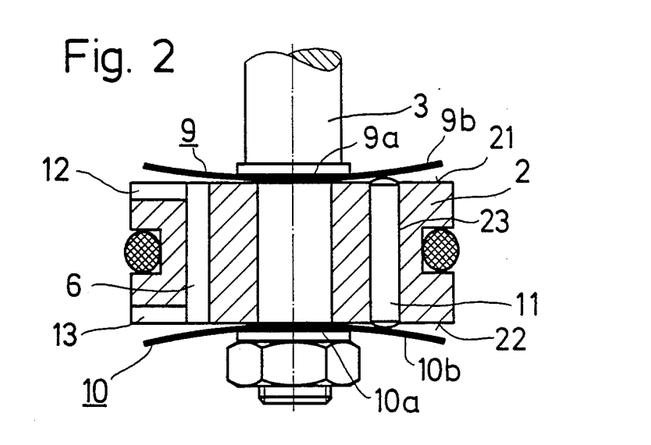
FIG. 2 shows a damping piston of the oscillation damper according to FIG. 1 in an enlarged representation.

The oscillation damper as shown in FIGS. 1 and 2 comprises a cylinder 1 with a cavity therein. The cavity is divided into two working chambers 4 and 5 by a piston 2. This piston 2 is fastened to a piston rod 3. The piston 2 is provided with valve bores 6 such that the two working chambers 4 and 5 are interconnected. The working chambers 4 and 5 are filled with a damping liquid. The working chamber 5 is interconnected by a bottom valve unit 7 with a compensation chamber 8. An elastic separation wall 20 separates the liquid from a volume of gas. On both end faces 21, 22 of the piston 2 there are provided resilient valve discs 9 and 10. These valve discs 9 and 10 are centrally fixed on the piston rod 3 together with the piston 2. The central portions of the valve discs 9 and 10 are designated by 9a and 10a while the circumferential portions of said valve discs 9 and 10 are designated by 9b and 10b. The piston 2 is provided with three axially directed valve bores 6 which are angularly spaced by 120° about the axis of the piston rod. Angularly between respective valve bores 6 there are provided three further guide bores 23, in which guide bores 23 cylindrical pins 11 are slidably guided. These pins 11 are somewhat longer than the thickness of the piston 2 such that the cylindrical pins 11 engage the circumferential portions 9b and 10b of both the valve disc 9 and the valve disc 10, respectively. These circumferential portions 9b and 10b are held in a lifted position from the respective end faces 21 and 22, so that in the zero movement velocity condition the valve bores 6 are open at both ends thereof Only starting at a predetermined piston velocity, the valve discs 9 and 10 change their shape. If e.g. the piston rod 3 moves outwards with respect to the cylinder 1, the upper valve disc 9 is approached by dynamic forces against the upper end face 21, while the lower valve disc 10 is further lifted from the respective end face 12, while simultaneously increasing the resistance of the valve disc 9 against said deformation When the valve disc 9 is in full contact with the end face 21, only the groove 12 is open and defines the damping resistance. When the piston rod 3 is moved inwards, the lower valve disc 10 approaches at a predetermined velocity of the piston 2 the lower end face 22 of the piston 2 such that only the groove 13 remains open.

The embodiment is shown in FIGS. 1 and 2 is particularly useful if the prestress of the upper valve disc 9 and the lower valve disc 10 is substantially equal so that both valve discs 9 and 10 are held in approximately identical positions with respect to the respective faces. The valve bores 6 in the piston 2 are open to liquid flow both at inward and outward movement of the piston rod. In order to obtain the increased damping at increased movement velocity of the piston, one of the bores may be provided with a groove 12 and one of the bores may be provided with a groove 13. The increase of damping resistance is dependent on the cross-sectional area of the respective grooves 12 or 13.

Figure 3:
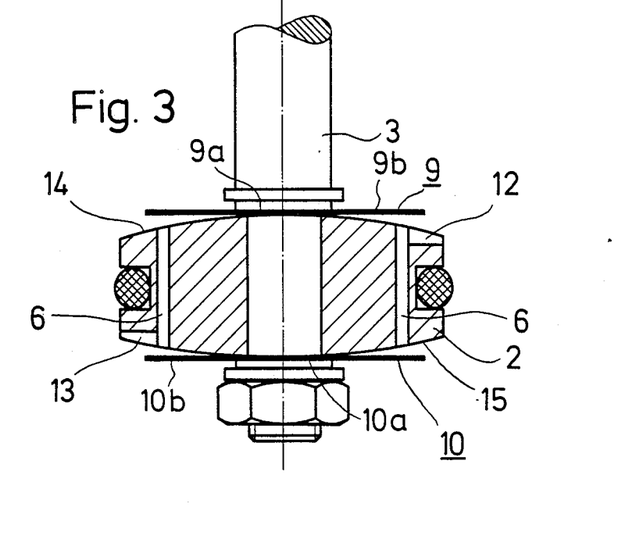
FIG. 3 shows a further embodiment of the damping piston.

A further very simple embodiment is shown in FIG. 3. Also in this embodiment, the piston 2 is fastened together with the valve discs 9 and 10 to the piston rod 3. The piston 2 has a convex upper end face 14 and a convex lower end face 15. As the upper valve disc 9 and the lower valve disc 10 are in a planar position, the valve discs 9 and 10 allow free liquid passage through the valve bores 6 at zero movement velocity of the piston with respect to the cylinder. Starting from a predetermined movement velocity of the piston 2 in outward direction, the upper valve disc 9 is applied against the upper convex end face 14 by dynamic forces and closes the bores 6. Then the damping resistance is only controlled by the groove 12. The operation is analogous, if the piston rod moves in inward direction: the lower valve disc 10 is applied against the lower convex end face 15 of the piston 2, and the damping resistance is controlled by the steadily open groove 13. By selecting the convexity of the end faces 14 and 15 and by selecting the stiffness of the valve discs 9 and 10, it is easily possible to provide various damping resistance characteristics for the inward and outward movement of the piston rod.

Figure 4:
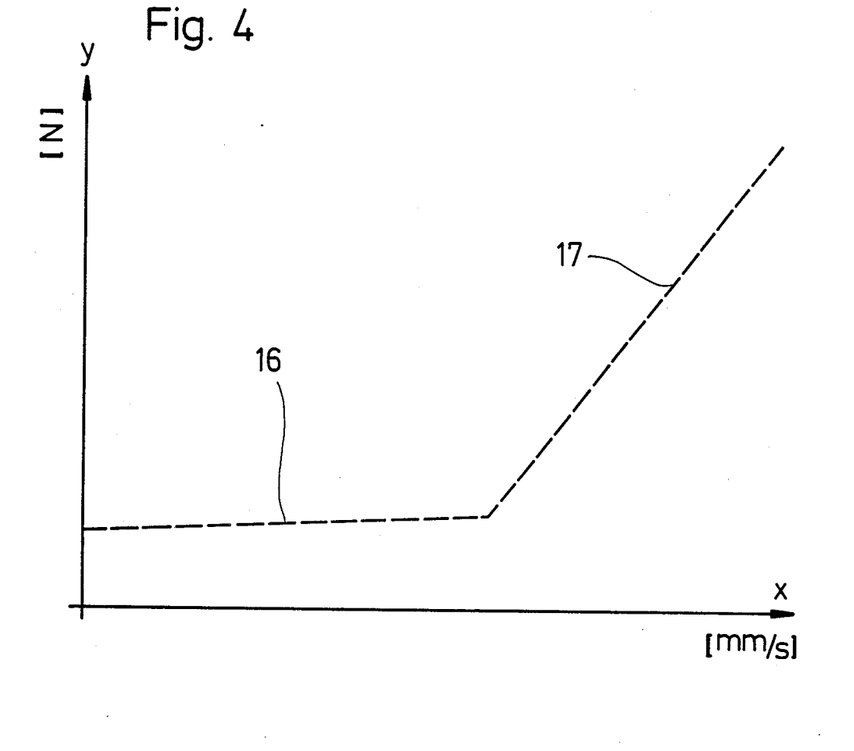
FIG. 4 shows the damping resistance-movement velocity characteristic or an oscillation damper according to FIG. 1.
Figure 5:
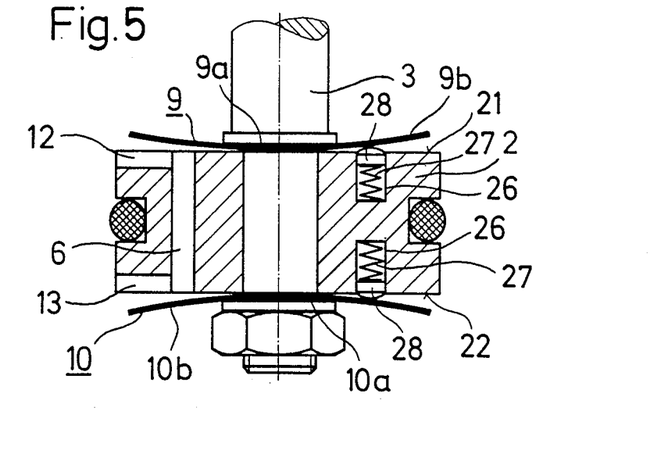
FIG. 5 shows a further embodiment of a damping piston.

The embodiment of FIG. 5 is similar to the embodiment of FIG. 2. In this embodiment, cylindrical pockets 26 are provided in the piston 2. Helical compression springs 27 are accommodated within the pockets 26 and act axially onto pins 28 which are in engagement with the circumferential portions 9b and 10b. In FIG. 4, a damping resistance characteristic is shown for an oscillation damper, as shown in FIGS. 1 and 2. The damping forces are indicated along the y-line, whereas the piston velocity is indicated along the x-line. Up to a predetermined velocity, the damping resistance characteristic is extremely flat (section 16 of the characteristic). At the predetermined velocity, the valve bores 6 are closed by one of the valve discs, so that only the grooves 12 or 13 remain open. As a result thereof, a strongly progressive characteristic section 17 is obtained.

The oscillation dampers of the present invention are particularly useful for damping the steering movement of motorcycles. In the embodiment of FIGS. 1 to 3 it is possible to select the predetermined velocity at which the characteristic section 16 changes over into the characteristic section 17 by selecting the prestress and/or the stiffness of the valve discs 9 and 10.

It can easily be understood that instead of one valve disc a plurality of valve discs can be provided on each end face according to the desired characteristic of the damping resistance.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. An oscillation damper comprising a cylinder member having an axis and defining a cavity (4, 5, 8) therein, and further comprising a piston rod member (3) axially movable with respect to said cylinder member (1) inwards and outwards of said cavity (4, 5, 8), at least two compartments (4, 5) being provided within said cavity (4, 5, 8), said compartments (4, 5) containing a damping liquid and being interconnected by a damping valve unit (2, 6, 9, 10), throttled flow of liquid occurring through said damping valve unit (2, 6, 9, 10) as a response to axial movement of said piston rod member (3) with respect to said cylinder member (1), the throttling effect of said damping valve unit (2, 6, 9, 10) being increased in response to increasing movement velocity of said axial movement such as to provide an increased damping resistance to said axial movement in response to said increasing movement velocity, said damping valve unit (2, 6, 9, 10) comprising a carrier member (2) and two resilient valve discs (9, 10), overlying two axially oppositely directed faces (21, 22) of said carrier member (2), each of said valve discs (9, 10) having a central portion (9a, 10a) attached to the respective face (21, 22) of said carrier member (2), and a circumferential portion (9b, 10b) spaced from the respective face (21, 22) at zero movement velocity, at least one valve bore (6) extending through said carrier member (2) between said compartments (4, 5) and having respective openings towards respective compartments (4, 5) within the respective face (21, 22) and below the respective circumferential portion (9b, 10b) of the respective resilient valve disc (9, 10), wedge-shaped circumferential gaps being defined at zero velocity between the respective face (21, 22) and the respective circumferential portion (9b, 10b) of the respective resilient valve discs (9, 10), said wedge-shaped circumferential gaps being in communication with each other through said at least one valve bore (6) and with the respective compartment (4, 5) at zero movement velocity, said communication being at least partially closed at increasing movement velocity by the respective circumferential portion (9b, 10b) approaching the respective face (21, 22) in response to increasing liquid flow velocity between said compartments (4, 5), said circumferential portion (9b, 10b) of each one of said resilient valve discs (9, 10) being biased towards its zero movement velocity position by at least one support pin (11) movably accommodated by a respective guide bore (23) through said carrier member (2), said support pin (11) being longer than the distance between said faces (21, 22) and engaging both valve discs (9, 10), said at least one valve bore (6) being free of axial support-means for said resilient valve discs (9, 10), said at least one guide bore (23) being substantially closed for liquid flow by said support pin (11).

2. An oscillation damper as claimed in claim 1, further comprising means defining a minimum cross-section flow passage (12) between said two compartments (4, 5) even if one of said circumferential gaps is fully closed.

3. An oscillation damper as claimed in claim 2, wherein said minimum cross-section flow passage defining means comprises at least one groove (12) in at least one of said faces (21, 22), said at least one groove (12) communicating with said at least one valve bore (6) and extending beyond the respective circumferential portion (9b, 10b) of the respective resilient valve disc (9, 10).

4. An oscillation damper as claimed in claim 1, a plurality of valve bores (6) being provided in parallel within said carrier member (2).

5. An oscillation damper as claimed in claim 1, wherein said faces (14, 15) are convex, and said resilient valve discs (9, 10) are substantially planar towards the respective convex faces (14, 15) at zero flow velocity.

6. An oscillation damper as claimed in claim 1, comprising a plurality of guide bores (23) with respective support pins (11).

7. An oscillation damper as claimed in claim 1, comprising a plurality of valve bores (6) a plurality of guide bores (23) with respective support pins (11), said valve bores (6) and guide bores (23) being distributed about said axis.

8. An oscillations damper as claimed in claim 7, wherein said valve bores (6) and said guide bores (23) are spaced circumferentially about said axis, with said valve bores (6) and said guide bores (23) being alternately spaced.

9. An damping valve unit for damping liquid flow between two adjacent compartments (4, 5), said damping valve unit having an axis and comprising a carrier member (2) and two resilient valve discs (9, 10), overlying two axially oppositely directed faces (21, 22) of said carrier member (2), each of said valve discs (9, 10) having a central portion (9a, 10a) attached to the respective face (21, 22) of said carrier member (2), and a circumferential portion (9b, 10b) spaced from the respective face (21, 22) at zero flow velocity, at least one valve bore (6) extending through said carrier member (2) between said compartments (4, 5) and having respective openings towards respective compartments (4, 5) within the respective face (21, 22) and below the respective circumferential portion (9b, 10b) of the respective resilient valve disc (9, 10), wedge-shaped circumferential gaps being defined at zero velocity between the respective face (21, 22) and the respective circumferential portion (9b, 10b) of the respective resilient valve discs (9, 10), said wedge-shaped circumferential gaps being in communication with each other through said at least one valve bore (6) and with the respective compartment (4, 5) at zero movement velocity, said communication being at least partially closed at increasing flow velocity by the respective circumferential portion (9b, 10b) approaching the respective face (21, 22) in response to increasing liquid flow velocity between said compartments (4, 5), said circumferential portion (9b, 10b) of each one of said resilient valve discs (9, 10) being biased towards its zero movement velocity position by at least one support pin (11) movably accommodated by a respective guide bore (23) through said carrier member (2), said support pin (11) being longer than the distance between said faces (21, 22) and engaging both valve discs (9, 10), said at least one valve bore (6) being free of axial support-means for said resilient valve discs (9, 10), and said at least one guide bore (23) being substantially closed for liquid flow there through by said support pin (11).

10. An oscillation damper comprising a cylinder member having an axis and defining a cavity (4, 5, 8) therein, and further comprising a piston rod member (3) axially movable with respect to said cylinder member (1) inwards and outwards of said cavity (4, 5, 8), at least two compartments (4, 5) being provided within said cavity, said compartments containing a damping liquid and being interconnected by a damping valve unit (2, 6, 9, 10), throttled flow of liquid occurring through said damping valve unit as a response to axial movement of said piston rod member with respect to said cylinder member, the throttling effect of said damping valve unit being increased in response to increasing movement velocity of said axial movement such as to provide an increased damping resistance to said axial movement in response to said increasing movement velocity, said damping valve unit comprising a carrier member (2) and two resilient valve discs (9, 10), overlying two axially oppositely directed faces (21, 22) of said carrier member, each of said valve discs having a central portion (9a, 10a) attached to the respective face (21, 22) of said carrier member, and a circumferential portion (9b, 10b) spaced from the respective face at zero movement velocity, at least one valve bore (6) extending through said carrier member between said compartments and having a respective opening towards said respective compartments within the respective face and below the respective circumferential portion of the respective resilient valve disc, wedge-shaped circumferential gaps being defined at zero velocity between the respective face and the respective circumferential portion of the respective resilient valve discs, said wedge-shaped circumferential gaps being in communication with each other through said at least one valve bore and with the respective compartment at zero movement velocity, said communication being at least partially closed at increasing movement velocity by the respective circumferential portion approaching the respective face in response to increasing liquid flow velocity between said compartments, each one of said resilient valve discs being elastically biased towards its zero movement velocity position by at least one respective support means (11) accommodated within a respective blind pocket (26) of said carrier member, each support means comprising a compression spring (27) and a pin (28) in the respective blind pocket, said pin projecting beyond the respective blind pocket and engaging the respective resilient valve disc.

11. A damping valve unit for damping liquid flow between two adjacent compartments (4, 5) having an axis and comprising a carrier member (2) and two resilient valve discs (9, 10), overlying two axially oppositely directed faces (21, 22) of said carrier member, each of said valve discs having a central portion (9a, 10a) attached to the respective face of said carrier member and a circumferential portion (9b, 10b) spaced from the respective face at zero flow velocity, at least one valve bore (6) extending through said carrier member between said compartments and having a respective opening towards respective compartments within the respective face and below the respective circumferential portion of the respective resilient valve disc, wedge-shaped circumferential gaps being defined at zero velocity between the respective face and the respective circumferential portion of the respective resilient valve discs, said wedge-shaped circumferential gaps being in communication with each other through said at least one valve bore and with the respective compartment at zero flow velocity, said communication being at least partially closed at increasing flow velocity by the respective circumferential portion approaching the respective face in response to increasing liquid flow velocity between said compartments, with one of said resilient valve discs being biased towards its zero flow velocity position by at least one respective support means (11) accommodated within a respective blind pocket (26) of said carrier member, each support means comprising a compression spring (27) and a pin (28) in the respective blind pocket, said pin projecting beyond the respective blind pocket and engaging the respective resilient valve disc.

* * * * *

UNITED STATES PATENT AND TRADEMARK OFFICE
CERTIFICATE OF CORRECTION

PATENT NO. : 4,961,482

DATED : Oct. 9, 1990

INVENTOR(S) : Pohlenz et al.

Figure 6:
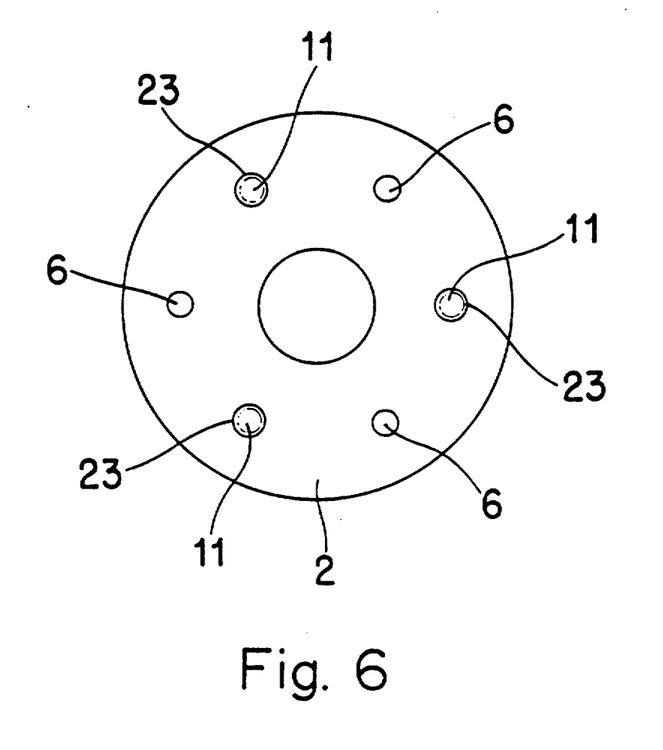

It is certified that error appears in the above-identified patent and that said Letters Patent is hereby corrected as shown below:

Drawing Sheet, consisting of Fig. 6, should be added, as shown on the attached page.

Col. 4, line 22, "or" should read --of--; line 23, delete "and"; line 25, "." should read -- ; and--; line 26, insert --FIG. 6 shows a piston having a plurality of guide bores and a plurality of valve bores.--; line 58, after "thereof" insert a period; line 66, after "deformation" insert a period.

Col. 7, line 18, after "(6)" insert --and--; line 22, "oscillations" should read --oscillation--; line 27, "An" should read --A--.

Signed and Sealed this

Fifth Day of May, 1992

Attest:

DOUGLAS B. COMER

Attesting Officer

Acting Commissioner of Patents and Trademarks

Fig. 6